United States Patent
Buentello et al.

(10) Patent No.: US 10,977,881 B1
(45) Date of Patent: Apr. 13, 2021

(54) RULES BASED ANALYSIS OF VEHICLE SENSOR DATA FOR ACTIONS

(71) Applicant: United Services Automobile Association (USAA), San Antonio, TX (US)

(72) Inventors: Andre R. Buentello, San Antonio, TX (US); Gregory David Hansen, Helotes, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 169 days.

(21) Appl. No.: 16/242,766

(22) Filed: Jan. 8, 2019

Related U.S. Application Data

(60) Provisional application No. 62/615,179, filed on Jan. 9, 2018.

(51) Int. Cl.
| | |
|---|---|
| *G07C 5/08* | (2006.01) |
| *G07C 5/00* | (2006.01) |
| *G06Q 50/30* | (2012.01) |
| *G06Q 20/40* | (2012.01) |

(52) U.S. Cl.
CPC ............ *G07C 5/0808* (2013.01); *G06Q 20/40* (2013.01); *G06Q 50/30* (2013.01); *G07C 5/006* (2013.01)

(58) Field of Classification Search
CPC .................................................. G07C 5/0808
See application file for complete search history.

(56) References Cited

U.S. PATENT DOCUMENTS

| | | | |
|---|---|---|---|
| 7,003,289 B1* | 2/2006 | Kolls ................. | G07C 5/008 455/422.1 |
| 9,472,028 B2* | 10/2016 | Abdel-Rahman ...... | G06Q 10/20 |
| 10,489,132 B1* | 11/2019 | Bloomcamp ............ | G06F 8/65 |
| 2009/0125460 A1* | 5/2009 | Hewison ................ | G06Q 50/30 706/11 |
| 2013/0103236 A1* | 4/2013 | Mehrgan ................. | B60Q 1/00 701/22 |
| 2015/0142255 A1* | 5/2015 | Gormley ............... | G07C 5/008 701/31.4 |
| 2018/0095638 A1* | 4/2018 | Merg ..................... | H04W 4/70 |
| 2018/0289999 A1* | 10/2018 | Kay ........................ | G07C 5/12 |
| 2019/0154453 A1* | 5/2019 | Leone .................. | G05D 1/0088 |
| 2019/0187727 A1* | 6/2019 | Reepmeyer .......... | G08G 5/0034 |
| 2020/0258323 A1* | 8/2020 | Colvin ................. | G07C 5/0816 |

* cited by examiner

*Primary Examiner* — Alex C Dunn
(74) *Attorney, Agent, or Firm* — Fish & Richardson P.C.

(57) ABSTRACT

Techniques are described for determining and performing actions associated with a vehicle based on an analysis of sensor data that describes a state of component(s) of the vehicle. Sensor data is generated by sensor(s) on a vehicle and/or external to the vehicle. The sensor data is analyzed to determine a current state of vehicle component(s), such as whether a component is damaged or otherwise in need of repair or maintenance. The analysis of the sensor data may be performed by a rules engine that applies a set of rules indicating what action(s) are to be performed based on certain detected states of the vehicle component(s) indicated by the sensor data. The rule(s) may also indicate instances in which action(s) can be performed automatically or autonomously in response to detecting vehicle component state(s), or whether authorization is to be requested from an owner, operator, or other individual associated with the vehicle.

20 Claims, 4 Drawing Sheets

RULES BASED ANALYSIS OF VEHICLE SENSOR DATA FOR ACTIONS

CROSS-REFERENCE TO RELATED APPLICATION

The present application is related to, and claims benefit of, U.S. Provisional Patent Application No. 62/615,179, titled "Rules Based Analysis of Vehicle Sensor Data for Actions," which was filed on Jan. 9, 2018, the entire contents of which are incorporated by reference into the present application.

BACKGROUND

Maintaining a complex electrical and mechanical system, such as a vehicle, traditionally requires regular inspections, care, and vigilance, to ensure that the device is system is operating as expected or as designed. In many instances, if a minor problem in a vehicle goes undetected and/or uncorrected it can lead to a more serious, more expensive problem, or even lead to a harmful accident.

SUMMARY

Implementations of the present disclosure are generally directed to performing actions based on a detected state of vehicle component(s). More particularly, implementations of the present disclosure are directed to determining a current state of vehicle component(s) based on sensor data generated by sensor(s) in the vehicle and/or external to the vehicle, and applying a set of rule(s) to the state information and/or sensor data to determine action(s) to be performed, such as action(s) to address maintenance issues present in the vehicle component(s) as exhibited by the sensor data.

In general, innovative aspects of the subject matter described in this specification can be embodied in methods that includes operations of: receiving sensor data that is generated, at least in part, by at least one sensor incorporated into a vehicle, the sensor data describing a current state of at least one component of the vehicle; applying one or more rules to the sensor data to determine at least one action to be performed based at least partly on the current state of the at least one component, wherein the at least one action includes sending a communication to initiate a repair of the at least one component of the vehicle; performing the at least one action; and sending a notification to a user device of a user associated with the vehicle, the notification indicating that the at least one action has been performed.

Implementations can include one or more of the following features: the operations further include determining, based at least partly on the one or more rules, that the at least one action is to be performed automatically without an explicit re-authorization by the user associated with the vehicle; the at least one action is performed automatically; the operations further include determining, based at least partly on the one or more rules, that the at least one action is to be performed based on the explicit re-authorization by the user associated with the vehicle; the at least one action is performed in response to receiving the explicit re-authorization by the user; the one or more rules indicate that the at least one action is to be performed automatically, without the explicit re-authorization by the user, based on determining that a monetary value associated with the at least one action is less than a threshold amount; the sensor data further includes external sensor data that describes the vehicle, the external sensor data generated by at least one external sensor separate from the vehicle; the at least one action is performed in real time with respect to the receiving of the sensor data; the sensor data indicates damage to the at least one component of the vehicle; the at least one action includes communicating with at least one service provider to request service to address the damage; and/or determining that the at least one action is to be performed automatically without the explicit re-authorization by the user is further based on preference data specified by the user.

Other implementations of any of the above aspects include corresponding systems, apparatus, and computer programs that are configured to perform the actions of the methods, encoded on computer storage devices.

Implementations of the present disclosure provide one or more of the following technical advantages and/or improvements compared to traditional systems. Implementations provide for the determination and performance of action(s) to address issues identified in vehicle components, based on an analysis of sensor data that describes a state of the vehicle and/or its components. Because such actions can be performed automatically, without requiring additional user authorization, implementations avoid the expenditure of network bandwidth, processing power, storage space, active memory, and/or other computing resources that would be expended to communicate and request authorization, and process the authorization. Moreover, by responding more quickly to vehicle component issues based on analyzed sensor data, implementations more efficiently use such computing resources compared to previously available solutions that may cause greater expenditure of computing resources due to a delayed response to an issue.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
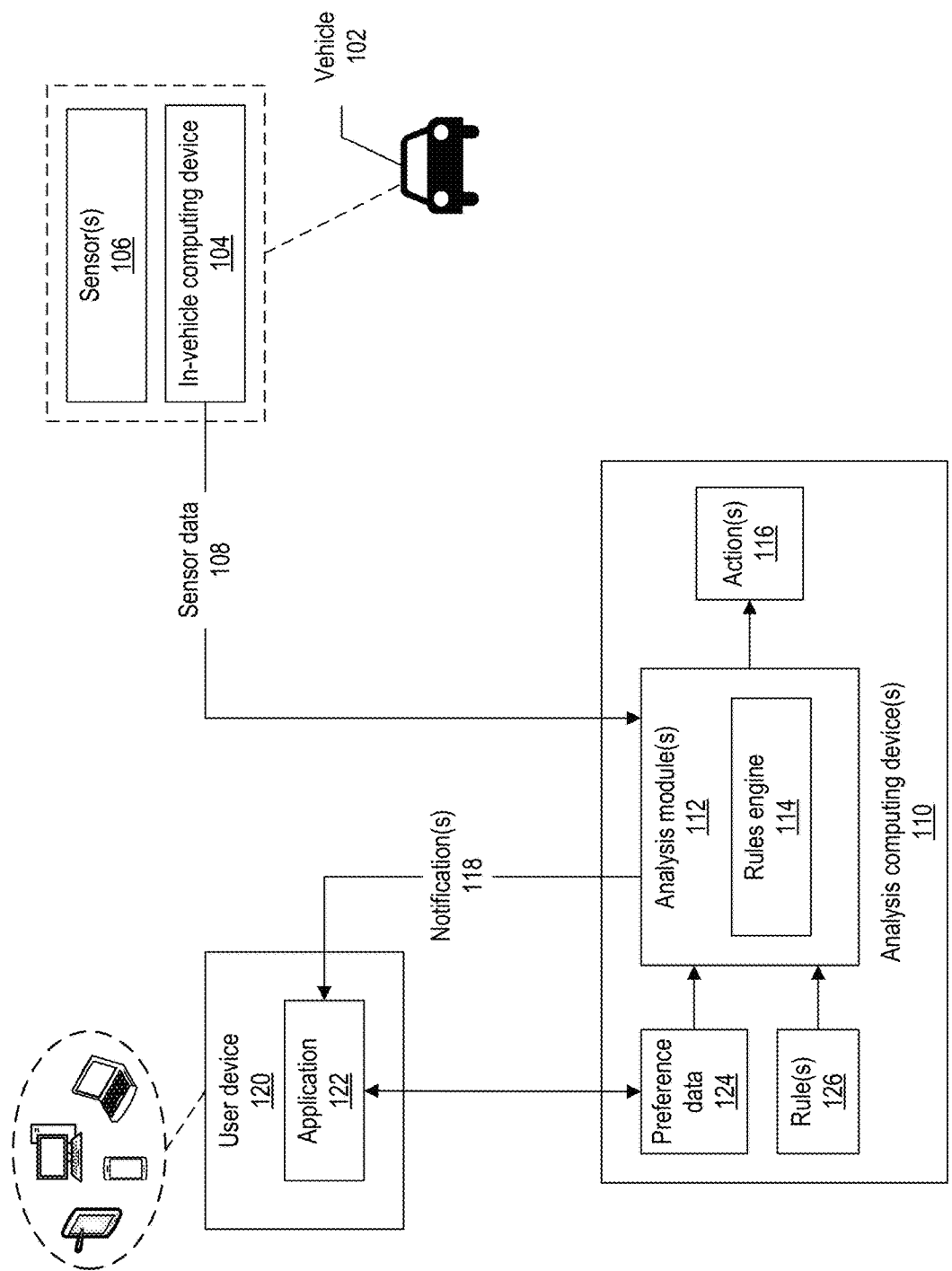
FIG. 1 depicts an example environment for performing actions based on vehicle sensor data, according to implementations of the present disclosure.

Implementations of the present disclosure are directed to systems, devices, methods, and computer-readable media for determining and performing actions associated with a vehicle, based on an analysis of sensor data that describes a state of one or more components of the vehicle. Sensor data is generated by one or more sensors that are in, or on, a vehicle, such as an automobile. Sensor data may also be generated by sensor(s) that are external to the vehicle, such as camera, microphones, or other types of sensors that are in the vicinity of the vehicle or that are otherwise situated to collect sensor data that describes the vehicle. The sensor data may be analyzed to determine a current state of at least one component of the vehicle. For example, the sensor data can indicate that a component is damaged or otherwise in need of repair or maintenance. In some implementations, the analysis of the sensor data is performed by a rules engine that applies a set of rules to the sensor data, the rule(s) indicating what action(s) are to be performed based on certain detected states of the vehicle component(s), as indicated by the sensor data. The rule(s) may also indicate instances in which action(s) can be performed automatically or autonomously in response to detecting vehicle component state(s), or whether authorization is to be requested from an owner, operator, or other individual associated with the vehicle. After performing the action(s), either automatically in based on the granted authorization from the individual, the individual may be notified that the action(s) have been performed. In some instances, the action(s) performed also include the submission or initiation of insurance claims to at least partly pay the cost of repair, replacement, and/or maintenance of vehicle components that have been damaged.

Traditionally, repair, maintenance, insurance claims, and/or other actions are initiated by a user, such as an owner or operator of a vehicle that requires maintenance. This can be a burden to the user, and any delay in addressing a problem (either through procrastination or ignorance of the problem), can cause additional damage and greater expense to the user and/or their insurer. In the implementations described herein, a vehicle is equipped with sensor(s) (also described as sensor devices) that monitor the state of various components of the vehicle, and generate sensor data describing the state of component(s). In the event of an accident, mechanical or electrical malfunction, or other damage to the vehicle, the sensor data may be analyzed to determine the nature of the problem and identify one or more appropriate actions to be taken in response to the problem. The response action(s) may include sending a communication to request that a technician repair the issue, an insurance adjuster survey the scene, a drone, satellite, or fixed camera take pictures and gather data regarding the vehicle and its surroundings, and so forth. For example, in the case of a flat tire indicated in the sensor data, roadside assistance personnel can be dispatched to the location of the vehicle to repair or replace the tire. The user (e.g., owner, operator) can then be sent an automated notification about the claim initialization, or the claim initialization can begin automatically. A process may be launched to initiate the insurance claim and/or resolution process (e.g., immediately) following the incident. This would remove the burden from the user and provide faster resolution of the issue, thereby saving the user and their insurer time, money, and effort.

In some implementations, sensor data is collected and analyzed in real time, and/or the action(s) that are determined to be appropriate may be performed in real time with respect to the collection and/or analysis of the sensor data. For example, following an accident involving a vehicle, the sensor data may be collected and analyzed in real time (e.g., with respect to the incident), and action(s) may be identified and performed in real time. In accordance with implementations described herein, real time operations may include operations that can be automatically executed, without requiring human input and without any intentional delay, taking into account the processing limitations of the computing system(s) performing the operations and the time needed to perform the operations. The data, such as the sensor data describing the current state of the vehicle component(s), may be analyzed in real time with respect to the generation of the data by the sensor(s) and with respect to the transmission of the data to analysis computing device(s). For example, there may be no intentional delay between the collection of the data, the analysis of the data, the identification of action(s), and the performing of action(s), beyond the latency incurred in communicating the data over network(s) and performing the analysis operations on computing system(s).

FIG. 1 depicts an example environment according to implementations of the present disclosure. As shown in the example of FIG. 1, the environment may include one or more vehicles 102. Although examples may describe the vehicle 102 as an automobile (e.g., car), implementations are not so limited. The vehicle 102 may include any form of conveyance, such as automobiles, trucks, recreational vehicles (RVs), motorcycles, scooters, military vehicles, trains, buses, watercraft (e.g., boats), submersible vehicles (e.g., submarines), heavier-than-air aircraft (e.g., airplanes), lighter-than-air aircraft (e.g., dirigibles), spacecraft, and so forth. The vehicle 102 may be powered by one or more motors or engines using any fuel. The vehicle 102 may also be a human-powered or animal-powered vehicle such as a bicycle, skateboard, rowboat, kayak, horse-drawn carriage, and so forth. The vehicle 102 may include various sensor(s) 106 that collect or otherwise generate sensor data 108 that describes the state of one or more components of the vehicle, such as engine components, electrical components, drive components, tires, body elements (e.g., panels, doors, windows, roof, bumpers, etc.), seats, and so forth. In some implementations, the vehicle may also include an in-vehicle computing device 104, which is described below in more detail. The sensor data 108 generated by the sensor(s) 106 may be received by the device 104, over one or more wired or wireless connections between the sensor(s) 106 and the device 104. The device 104 may then send the sensor data 108 over one or more networks to one or more analysis computing devices 110. The sensor data 108 may be communicated using one or more network interfaces (e.g., transceivers) incorporated into the device 104. In some instances, the sensor data 108 may be communicated from the sensor(s) 106 to the analysis computing device(s) 110 without passing through the device 104 as an intermediary.

The vehicle 102 may be operated by a driver. The driver may include one or more individuals who operate, or travel within, the vehicle 102. Although examples herein describe a driver of a car, implementations are not so limited. Accordingly, the driver may be any operator or occupant of a vehicle 102, such as a pilot of an airplane, a sailor of a ship, a rider of a bicycle, and so forth. Although examples herein may describe the driver as a person, implementations are not so limited. In some implementations, the driver may include computer hardware and/or computer software component(s) that autonomously, or semi-autonomously, operate the vehicle 102. For example, a human driver may be assisted by, or replaced by, an artificial intelligence, a robot, or any other combination of hardware and/or software component(s) configured to operate a vehicle 102. In some examples, the driver may carry, wear, or otherwise be in proximity to a mobile device (e.g., the user device 120) such as a smartphone, tablet computer, wearable computer, implanted computer, and so forth. In some instances, the mobile device may include any number of sensors that generate sensor data 108 describing the location, movement, orientation, or other status information regarding the mobile device. Such sensor data may be communicated to the analysis computing device(s) 110, using one or more network interfaces (e.g., transceivers) of the mobile device.

In some implementations, the environment includes one or more external sensors. The external sensor(s) may be external from but in proximity to the vehicle 102 at one or more times, and may be configured to collect sensor data 108 regarding the location, speed, orientation, or other characteristics of the vehicle 102. For example, external sensors may employ radar, sonar, infrared, radio-frequency identification sensors, or optical sensors to detect the presence of the vehicle 102 in proximity to the external sensor, and measure the vehicle's position, speed, acceleration, and orientation. External sensor(s) may also generate image(s) of the vehicle 102, video of the vehicle 102, audio data (e.g., sound recordings in the vicinity of the vehicle), information regarding the environment in proximity to the vehicle, such as weather conditions, road conditions, traffic conditions, and so forth. Such information may be communicated as sensor data 108 using one or more wired or wireless network interfaces (e.g., transceivers) that are incorporated into the external sensor(s) or that are communicatively coupled to the external sensor(s).

One or more sensors 106 in the vehicle 102, sensors of the mobile device, and/or external sensor(s) may also collect sensor data 108 describing the state of component(s) of the vehicle 102, and/or the operations of the vehicle 102. The sensor data 108 may be dynamic data that describes a current (e.g., real time) state of the vehicle 102 and/or its components. Such state information may describe the structural integrity, operational state (e.g., functional, non-functional, etc.), and/or other characteristics of vehicle components. The state information may also describe the vehicle 102 as a whole with regard to its location, position, orientation, speed, acceleration, deceleration (e.g., braking), direction of travel, or other characteristics. In some implementations, the sensor data 108 includes movement data that indicates changes in one or more of the speed, the direction, or the orientation of the vehicle 102. The orientation or direction of the vehicle 102 may include orientation or direction relative to any reference axis. Accordingly, orientation or direction may include yaw, pitch, roll, or other indications of orientation relative to any axis.

The sensor data 108 may also include location data that describes the location, or position, of the vehicle 102. The location data may be determined using any technique, and may be determined to any degree of specificity. For example, the vehicle 102 and/or a mobile device therein may include location sensor(s), transceiver(s), other hardware component(s), or other software component(s) configured to determine the location of the vehicle 102 or mobile device using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Globalnaya Navigatsionnaya Sputnikovaya Sistema (GLONASS) receiver, a Galileo receiver, an Indian Regional Navigational Satellite System, and so forth.

The sensor data 108 may also include other information, such as telematics data, that describes the vehicle 102 and/or its components. For example, the sensor data 108 may include information regarding the condition of the vehicle 102, such as the odometer reading, fuel efficiency, current status of fuel or other fluids, temperature, weight, number of wheels, tire condition, drive train condition, and so forth. The sensor data 108 may also indicate dynamic road conditions, such as whether the road is icy, wet, or dry, banked or not banked, flat, inclined, and so forth.

The sensor data 108 may be communicated over one or more wired or wireless networks to one or more analysis computing devices 110. In some implementations, the sensor data 108 may be received at the in-vehicle computing device 104, communicated over one or more wired or wireless connections with the sensor(s) 106, and transmitted by the device 104 to the analysis computing device(s) 110. In some implementations, a mobile device may be connected to a communications port in the vehicle 102, and the mobile device may receive sensor data 108 in the form of onboard diagnostics (OBD) and/or telematics data from vehicle sensor(s), device 104, and/or other in-vehicle systems. Such sensor data 108 may then be communicated to the analysis computing device(s) 110 from the mobile device over a cell network or other suitable wireless network. In some implementations, the device 104 may include a wireless transceiver that communicates sensor data 108 to the analysis computing device(s) 110. The mobile device, device 104, and/or external sensor(s) may communicate sensor data 108 to the analysis computing device(s) 110 directly or via one or more intermediary device(s). In some implementations, the mobile device may generate and send telematics data that is determined independently of onboard systems of the vehicle 102, and which may be described as mobile-only telematics data. For example, the mobile device may generate information regarding the location, orientation, speed, and/or acceleration of the vehicle 102 based on the determined location, orientation, speed, and/or acceleration of the mobile device as determined using sensors (e.g., gyroscopic sensors, accelerometers, location sensing technology, etc.) included in the mobile device. The mobile device collecting such data may be a computing device such as a smartphone, tablet computer, and so forth. The mobile device collecting the data may also be a stand-alone device (e.g., dongle) that includes various sensor device(s) and wireless transceiver for transmitting the collected sensor data. Such a stand-alone device may be headless, e.g., lacking a user interface of its own. The stand-alone device may connect to a port in the vehicle 102 and/or on the device 104 to receive power and/or data from various vehicle systems.

In some implementations, a user (e.g., driver) may receive reward(s) for agreeing to provide sensor data 108 from the device 104, sensor(s) 106, mobile device, and/or vehicle 102 to the analysis computing device(s) 110. For example, the user may be given a monetary reward, discount on premiums, points redeemable toward purchase of products or services, discounted insurance premiums, and/or other types of value.

The analysis computing device(s) 110 may execute one or more analysis modules 112 that are configured (e.g., as software) to analyze the sensor data 108 and determine action(s) 116 to be performed based on a detected state of the vehicle and/or vehicle component(s), as indicated in the sensor data 108. In some implementations, the analysis module(s) 112 include a rules engine 114 that applies a set of rule(s) 128 to the sensor data 108 to determine action(s) 116 to be performed.

The rule(s) 126 may also indicate conditions under which action(s) 116 can be performed automatically, or whether user authorization is required prior to performing the action(s) 116. For example, the rule(s) 126 may indicate that maintenance may be performed without explicit re-authorization (e.g., in this instance) by the user for those repairs or maintenance that has an associated cost below a threshold amount (e.g., less than $100). The user, in such instances, may have previously agreed to such rule(s) when registering or signing up for the service, and/or when opting in to agree to the collection and analysis of the sensor data 108, and the user may not be subsequently asked to authorize particular instances of repair and/or maintenance when the rule(s) 126 indicate that such repair and/or maintenance can be performed without explicit re-authorization by the user. The rule(s) 126 may also indicate particular types or categories of repair and/or maintenance that may be performed without the user's explicit re-authorization. For example, tire repairs, battery replacements, and so forth may be performed without explicit re-authorization by the user. In some examples, the action(s) 116 may include sending a communication over one or more networks to instruct an autonomous, or semi-autonomous repair vehicle to travel to the location of the vehicle to automatically initiate a repair of damaged components, and/or to automatically transport maintenance personnel to the vehicle to perform the repair.

In instances where explicit authorization is indicated in the rule(s) 126, a message may be sent to the user and displayed in an application 122 executing on the user device 120 of the user (e.g., the owner and/or operator of the vehicle 102). In some examples, the user device 120 may be the mobile device that is in the vehicle 102, as described above. User device 120 may include other computing device(s) operated by the user. User device(s) 120 may include any suitable type of computing device, including but not limited to personal computers, desktop computers, laptop computers, tablet computers, notebook computers, smartphones, personal data assistants (PDAs), wearable computers, implanted computers, server computers, cloud computing (e.g., distributed computing) devices, onboard vehicle computers, and so forth. On receiving the request for authorization, the user may use the application 122 to authorize (or not authorize) the action(s) 116. The action(s) 116 may then be performed in response to the user authorization.

In either scenario, if explicit re-authorization is indicated or not indicated by the rule(s) 124, following performance of the action(s) 116, a notification 118 may be sent to notify the user that action(s) have been performed. The notification 118 may be presented in the application 122 (e.g., a mobile app executing on the user device 120).

In some instances, the determination of action(s) 116 to be performed, and/or the determination whether explicit re-authorization is to be sought prior to performing action(s) 116, may be further controlled by preference data 124 specified by the user through the application 122 or otherwise. For example, the user may specify preferences for the threshold amount, below which action(s) 116 may be performed automatically without explicit re-authorization. The user may also specify the types of actions that may be performed without explicit re-authorization, such as tire repairs, window repairs, dead battery replacements, and so forth.

For example, the sensor data 108 may indicate that a tire on the vehicle as below threshold air pressure (e.g., below the recommended operating pressure for the particular equipped tires). Instead of the user finding out later and having to deal with the issue themselves, as would be the case with previously available solutions, the in-vehicle device 104 can send the sensor data 108 to the analysis computing device(s) 110, which analyze the data, identify the problem, and (e.g., automatically) perform an action 116 to correct the issue, such as dispatching maintenance personnel to the location of the vehicle 102 (e.g., as indicated in the sensor data 108) to put air in the tire, examine the tire for damage, replace the tire, and so forth. Accordingly, implementations enable an automated concierge service to assist the user in maintaining their vehicle. Other damage situations that may be addressed include, but are not limited to, light malfunctions, window damage, low fluid levels or replacement, dents or other body damage, low or dead battery, air filter replacements, and so forth. Actions may also include determining the covered loss under an insurance policy and (e.g., automatically) initiating a claim for damage following an accident or other incident. Action(s) may also include identifying and contacting a repair shop to handle repairs to the vehicle. In some instances, the system may negotiate for repair cost, on behalf of the user, with repair shops (e.g., to get the best possible deal for the user).

As described above, the rule(s) 126 can set parameters for damage amounts and indicate whether action(s) 116 can be performed automatically for a cost within a certain range. Rule(s) 126 may also specify the action(s) 116 to be performed, and whether such action(s) 116 can be performed automatically, based on other parameters such as location of the vehicle, time of day, day of the week, and so forth. For example, automated maintenance action(s) 116 may be permitted between 8:00 a.m. and 6:00 p.m., but authorization can be sought outside that range of times.

The analysis module(s) 112 may analyze the sensor data 108 to determine an extent of damage to vehicle components, a particular nature of the damage and/or malfunction of components, and so forth. The sensor data 108 can also be analyzed to determine a cause of the damage, and/or to determine whether the damage is covered under an insurance policy. In some implementations, a suitable machine learning technique may be applied to determine the state of the components based on the sensor data 108, the nature of damage to component(s), and/or the appropriate action(s) to be performed. External sensor data, such as data from traffic cameras, ambient sound detectors (e.g., microphones), security cameras, drones, satellites, data from other vehicles, and so forth, may be used to identify cause of damage, such as whether the damage was caused by an accident with another vehicle, vandalism, the driver's own negligence, and so forth.

In some instances, action(s) 116 performed in real time may include actions to address serious issues regarding the vehicle, such as issues preventing the normal use or operation of the vehicle. Alternatively, less urgent problems may be addressed later, e.g., through scheduled maintenance visits. Accordingly, action(s) may include scheduling an appointment with a service provider, and informing the user of the scheduled appointment (e.g., to check fluid levels, engine tune-up, etc.). In this way, the system may operate as a virtual personal assistant for the user, to keep track of maintenance issues and/or a maintenance schedule for the vehicle, such as manufacturer-recommended maintenance, regular service checks, government-mandated inspections, and/or other issues.

The rule(s) 126 may indicate when and/or if the notifications 118 are to be sent to the user, including when authorization is to be sought from the user prior to performing the action(s) 116. Rule(s) 126 may indicate whether notification is to be provided before, during, and/or after the action(s), and/or the parties to be notified (e.g., the driver, owner, driver's parents, etc.), In the example of FIG. 1, the analysis of the sensor data 108, determination of action(s) 116 to be performed, requests for authorization, notifications, and/or other operations are performed on the analysis computing device(s) 110. Alternatively, at least a portion of the processing may be performed by the in-vehicle device 104.

In some implementations, the in-vehicle device 104 is a vehicle computer that may include an on-board diagnostics (OBD) port. The computer may also include, and/or communicate with, one or more vehicle telematics sensors and/or component sensor(s) as described above. The computer may operate as a data collection device that is connected to the vehicle 102 via an OBD port connector that is connected to the OBD port to receive telematics data (e.g., sensor data 108) and/or other information generated by the telematics sensor(s) and/or other sensor(s) 106. Such information may be communicated to the data collection device over the OBD port.

In some implementations, the device 104 includes a central processing unit (CPU), a (e.g., satellite-based) navigation system receiver, at least one accelerometer, at least one orientation sensor, a memory, a UI, and at least one (e.g., wireless) network interface. The CPU may communicate with the other elements of the device 104 to facilitate the operation of the device 104. The CPU may be configured to process data received from one or more of the navigation system receiver, the accelerometer(s), the orientation sensor(s), or the OBD port connector. Data processing may include receiving sensor data 108 from one or more of the sensor(s) 106, the navigation system receiver, the accelerometer(s), the orientation sensor(s), or the OBD port connector, and communicating the sensor data 108 to the analysis computing device(s) 110 using the network interface(s). In some implementations, the CPU may analyze the sensor data 108 to determine action(s) and/or perform action(s) in addition to, or instead of, such operations being performed on the analysis computing device(s) 110. The sensor data 108 may be communicated, over one or more networks, using any communication protocol or in any format. In some examples, the sensor data 108 may be compressed, encrypted, or both prior to communication over networks and/or storage.

The navigation system receiver may include an antenna and associated signal processing circuitry for receiving signals from global navigation satellite system (GNSS) satellites, and determining the location of the device 104 based on the signals. GNSS satellites may be, for example, GPS, GLONASS, Galileo, or Beidou satellites which send time and orbital data which the device 104 may use to calculate its location. In some implementations, the CPU calculates the location of the data collection device 200 using the data received by the navigation system receiver. The CPU may retrieve location data from the navigation system receiver at set time intervals. The CPU may send the location data to the memory along with a timestamp (e.g., time and/or date) indicating when the data collection device was at the location. In some implementations, the navigation system receiver may be component of a separate navigation device used by the driver for obtaining driving directions or location information. In such examples, the navigation system receiver transmits data to the device 104 though a wired connection or a wireless connection, e.g., BlueTooth or Wi-Fi.

The accelerometer(s) may include any device that measures (e.g., proper) acceleration. Data collected from an accelerometer(s) may include or be used for determining g-force, acceleration, deceleration, orientation, shock, vibration, jerk, velocity, speed, and/or position of the device 104 or vehicle 102. In some examples, acceleration data describing the acceleration or deceleration of the vehicle 102 may be collected from other systems of the vehicle 102, such as the brakes or accelerator systems of the vehicle 102, or from onboard telematics devices that collect information from the brakes or acceleration systems.

The orientation sensor(s) may include any device that measures the orientation of the device 104, or the vehicle 102, relative to any reference axis. Orientation sensor(s) may measure yaw, pitch, or roll. Orientation sensor(s) may also include a compass or other device that measures the direction of the device 104, or the vehicle 102, with respect to a magnetic field such as the Earth's magnetic field. In some examples, orientation sensor(s) include one or more gyroscope-based sensors that detect change in orientation relative to one or more axes.

The sensor data 108 from one or more of the sensor(s) 106, the OBD port connector, the navigation system receiver, the accelerometer(s), or the orientation sensor(s) may be received by the CPU. The CPU may collect data at intervals, or continuously, and store the data in the memory of the device 104. Each data element may be associated with a timestamp and/or a location stamp indicating a location where the data was collected.

The device 104 may include network interface(s) for sending collected sensor data 108 to the analysis computing device(s) 110 via one or more wired or wireless networks. The device 104 may also be configured to communicate with the driver or a passenger via its UI, visually, through speech output, or otherwise. The UI may include output components, such as a display, speakers, or haptic output component(s). The UI may also include input components, such as a touch screen, keyboard, or audio input device (e.g., microphone). In some implementations, the UI may receive and present data such as vehicle diagnostics data, or sensor data 108. In some implementations, the device 104 may operate as a navigation device that can calculate and display a route to a destination specified by the driver.

Although examples herein may describe the driver or operator of a vehicle as a human driver, implementations are not limited to such scenarios. In some instances, the vehicle 102 may be operated by an artificial intelligence (AI), such that the vehicle 102 is autonomous, semi-autonomous, and/or driverless. In such instances, the action(s) performed may include sending instructions to the vehicle 102 to cause the vehicle 102 to move itself to a particular location for maintenance, such as a repair shop or maintenance bay. Action(s) may also include sending instructions to cause the vehicle 102 to remain at its current location until a repair vehicle and/or personnel arrive to address the problem that is exhibited in the sensor data 108.

Figure 2:
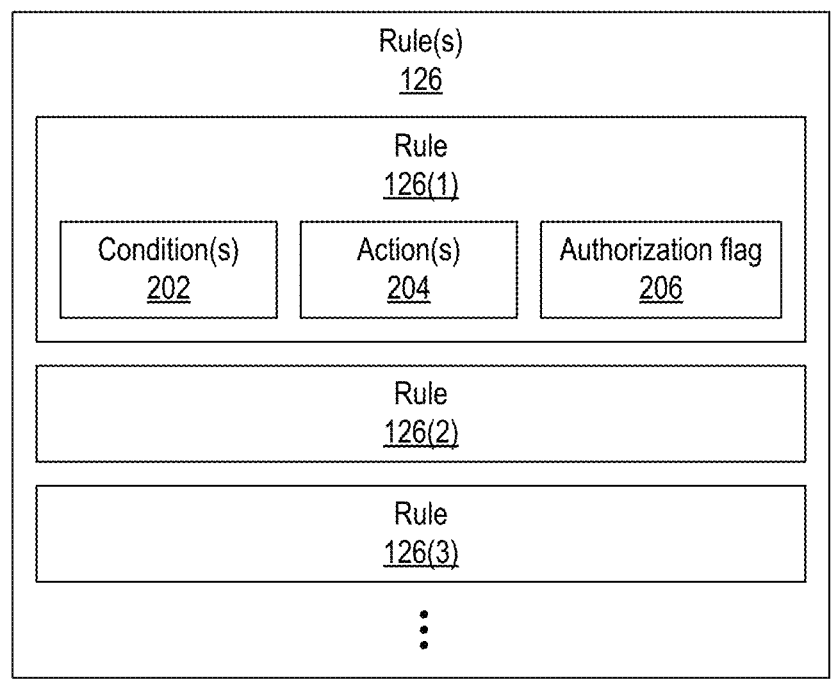
FIG. 2 depicts an example format for a rule set for determining actions, according to implementations of the present disclosure.

FIG. 2 depicts an example format for a rule set 126 for determining actions 116, according to implementations of the present disclosure. As shown in the example of FIG. 2, the rule(s) 126 may include any suitable number of rules. Each rule may specify one or more conditions 202, and one or more action(s) 204 to be performed if such condition(s) 202 are satisfied. A rule may also include an authorization flag 206, indicating whether the user's explicit re-authorization is required to perform the action(s) 204, or whether the action(s) 204 can be performed automatically if the condition(s) 202 are satisfied. A condition may be a value or range of values corresponding to a particular measured parameter included in the sensor data. For example, a condition may be that the tire pressure for any of the tires on the vehicle is below a threshold pressure value, and/or outside the recommendation range of operating pressure for the currently equipped tires. A condition may also be the presence of a particular issue in a component. For example, a condition may be that the sensor data indicates a chip in the windshield, a dent in a body panel, a dent in a bumper, the presence of an electrical short in the vehicle's electrical system, a detected fire in the engine, and so forth. Conditions may be arranged as a Boolean combination of multiple conditions, such as A and (B or C).

Figure 3:
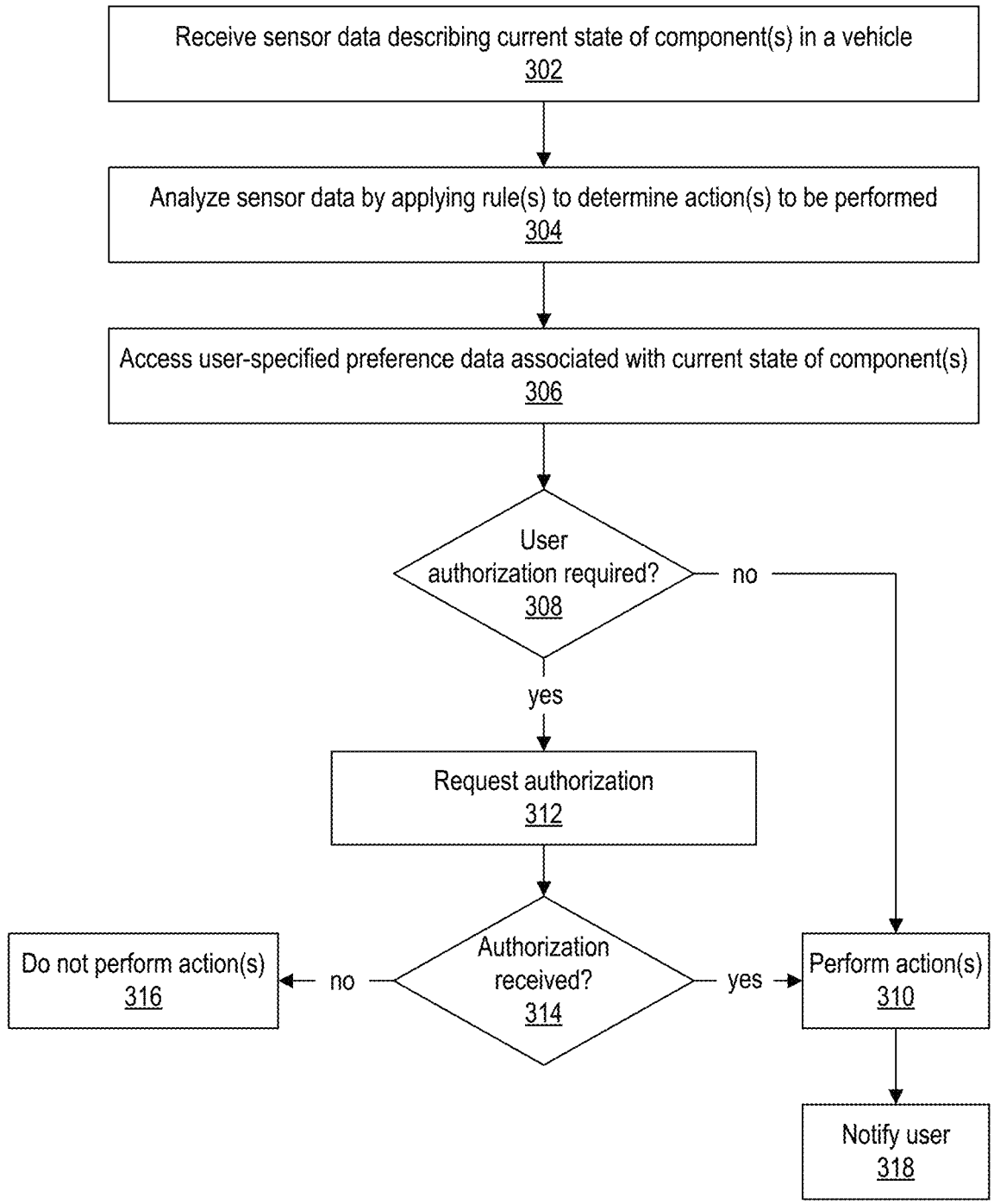
FIG. 3 depicts a flow diagram of an example process for determining and performing actions based on vehicle sensor data, according to implementations of the present disclosure.

FIG. 3 depicts a flow diagram of an example process for determining and performing actions 116 based on vehicle sensor data 108, according to implementations of the present disclosure. Operations of the process may be performed by one or more of the analysis module(s) 112, the rules engine 114, the application 122, and/or other software module(s) executing on the analysis computing device(s) 110, the in-vehicle computing device 104, the user device 120, and/or elsewhere.

The sensor data 106 is received (302), describing a (e.g., current) state of the vehicle 102 and/or components of the vehicle 102. The sensor data 106 is analyzed (304) to determine action(s) 116 to be performed. In some implementations, this analysis includes applying rule(s) 126 to determine suitable action(s) 116. In some implementations, preference data 124 is accessed (306).

Based on applying the rule(s) 126 and/or preference data 124 to the sensor data 106, a determination is made (308) whether explicit re-authorization is required from the user prior to performing the determined action(s) 116. If not, the action(s) 116 are performed (310). If explicit re-authorization is required, the authorization is requested (312) from the user. If authorization is received (314), the action(s) are performed (310). If not, the action(s) are not performed (316). After performing the action(s), either automatically or based on the user authorization, the user may be notified (318) that the action(s) have been performed, as described above.

Figure 4:
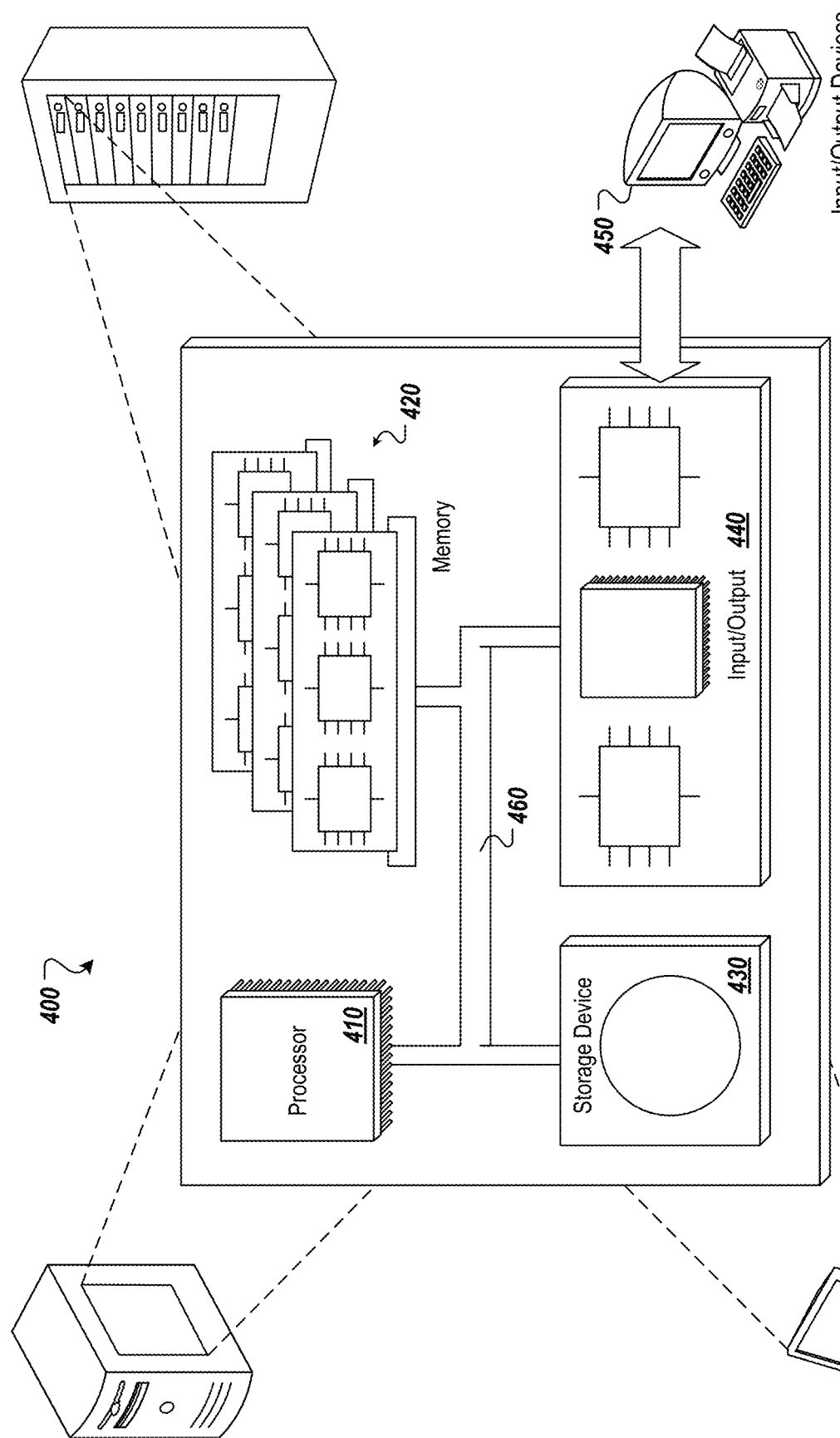
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the in-vehicle computing device 104, the user device 120, the analysis computing device(s) 110, and/or other computing devices or systems described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter that stores and/or emits a machine-readable propagated signal, or a combination of one or more of these. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:

receiving, by the at least one processor, sensor data that is generated, at least in part, by at least one sensor incorporated into a vehicle, the sensor data describing a current state of at least one component of the vehicle;

applying, by the at least one processor, one or more rules to the sensor data to determine at least one action to be performed based at least partly on the current state of the at least one component, wherein the at least one action includes sending a communication to initiate a repair of the at least one component of the vehicle;

performing, by the at least one processor, the at least one action by sending instructions to an artificial intelligence system associated with the vehicle which cause the vehicle to navigate to a location for the repair; and sending, by the at least one processor, a notification to a user device of a user associated with the vehicle, the notification indicating that the at least one action has been performed.

2. The method of claim 1, further comprising:

determining, by the at least one processor, based at least partly on the one or more rules, that the at least one action is to be performed automatically without an explicit re-authorization by the user associated with the vehicle; and wherein the at least one action is performed automatically.

3. The method of claim 1, further comprising:

determining, by the at least one processor, based at least partly on the one or more rules, that the at least one action is to be performed based on the explicit re-authorization by the user associated with the vehicle; and wherein the at least one action is performed in response to receiving the explicit re-authorization by the user.

4. The method of claim 1, wherein the one or more rules indicate that the at least one action is to be performed automatically, without the explicit re-authorization by the user, based on determining that a monetary value associated with the at least one action is less than a threshold amount.

5. The method of claim 1, wherein the sensor data further includes external sensor data that describes the vehicle, the external sensor data generated by at least one external sensor separate from the vehicle.

6. The method of claim 1, wherein the at least one action is performed in real time with respect to the receiving of the sensor data.

7. The method of claim 1, wherein:

the sensor data indicates damage to the at least one component of the vehicle; and the at least one action includes communicating with at least one service provider to request service to address the damage.

8. The method of claim 1, wherein determining that the at least one action is to be performed automatically without the explicit re-authorization by the user is further based on preference data specified by the user.

9. A system comprising:

at least one processor; and a memory communicatively coupled to the at least one processor, the memory storing instructions which, when executed, cause the at least one processor to perform operations comprising:

receiving sensor data that is generated, at least in part, by at least one sensor incorporated into a vehicle, the sensor data describing a current state of at least one component of the vehicle;

applying one or more rules to the sensor data to determine at least one action to be performed based at least partly on the current state of the at least one component, wherein the at least one action includes sending a communication to initiate a repair of the at least one component of the vehicle;

performing the at least one action by sending instructions to and artificial intelligence system associated with the vehicle which cause the vehicle to navigate to a location for the repair; and sending a notification to a user device of a user associated with the vehicle, the notification indicating that the at least one action has been performed.

10. The system of claim 9, the operations further comprising:

determining, based at least partly on the one or more rules, that the at least one action is to be performed automatically without an explicit re-authorization by the user associated with the vehicle; and wherein the at least one action is performed automatically.

11. The system of claim 9, the operations further comprising:

determining, based at least partly on the one or more rules, that the at least one action is to be performed based on the explicit re-authorization by the user associated with the vehicle; and wherein the at least one action is performed in response to receiving the explicit re-authorization by the user.

12. The system of claim 9, wherein the one or more rules indicate that the at least one action is to be performed automatically, without the explicit re-authorization by the user, based on determining that a monetary value associated with the at least one action is less than a threshold amount.

13. The system of claim 9, wherein the sensor data further includes external sensor data that describes the vehicle, the external sensor data generated by at least one external sensor separate from the vehicle.

14. The system of claim 9, wherein the at least one action is performed in real time with respect to the receiving of the sensor data.

15. The system of claim 9, wherein:

the sensor data indicates damage to the at least one component of the vehicle; and the at least one action includes communicating with at least one service provider to request service to address the damage.

16. The system of claim 9, wherein determining that the at least one action is to be performed automatically without the explicit re-authorization by the user is further based on preference data specified by the user.

17. One or more non-transitory computer-readable storage media storing instructions which, when executed by at least one processor, cause the at least one processor to perform operations comprising:

receiving sensor data that is generated, at least in part, by at least one sensor incorporated into a vehicle, the sensor data describing a current state of at least one component of the vehicle;

applying one or more rules to the sensor data to determine at least one action to be performed based at least partly on the current state of the at least one component, wherein the at least one action includes sending a communication to initiate a repair of the at least one component of the vehicle;

performing the at least one action by sending instructions to and artificial intelligence system associated with the vehicle which cause the vehicle to navigate to a location for the repair; and sending a notification to a user device of a user associated with the vehicle, the notification indicating that the at least one action has been performed.

18. The one or more computer-readable storage media of claim 17, the operations further comprising:

determining, based at least partly on the one or more rules, that the at least one action is to be performed automatically without an explicit re-authorization by the user associated with the vehicle; and wherein the at least one action is performed automatically.

19. The one or more computer-readable storage media of claim 17, the operations further comprising:

determining, based at least partly on the one or more rules, that the at least one action is to be performed based on the explicit re-authorization by the user associated with the vehicle; and wherein the at least one action is performed in response to receiving the explicit re-authorization by the user.

20. The one or more computer-readable storage media of claim 17, wherein the one or more rules indicate that the at least one action is to be performed automatically, without the explicit re-authorization by the user, based on determining that a monetary value associated with the at least one action is less than a threshold amount.

* * * * *